United States Patent [19]
Yasui et al.

[11] Patent Number: 5,111,681
[45] Date of Patent: May 12, 1992

[54] MOTOR DRIVEN HYDRAULIC TOOL

[75] Inventors: Tadashi Yasui, Kyoto; Masayuki Kobayashi, Matsumoto, both of Japan

[73] Assignees: Japan Storage Battery Co., Ltd.; Izumi Products Co.

[21] Appl. No.: 649,184

[22] Filed: Feb. 4, 1991

Related U.S. Application Data

[63] Continuation of Ser. No. 442,694, Nov. 29, 1989, abandoned.

[30] Foreign Application Priority Data

Mar. 31, 1989 [JP] Japan ................. 1-37854[U]
Mar. 31, 1989 [JP] Japan ................. 1-37855[U]

[51] Int. Cl.5 .......................................... H01R 43/042
[52] U.S. Cl. .............................. 72/453.03; 72/453.15; 72/453.16; 72/452; 29/751; 417/415
[58] Field of Search .................... 29/751; 72/391, 452, 72/453.15, 453.16, 453.03; 417/415, 417, 534

[56] References Cited

U.S. PATENT DOCUMENTS

| | | | |
|---|---|---|---|
| 2,759,665 | 8/1956 | Wilber | 417/415 |
| 2,926,840 | 3/1960 | Soumerai | 417/415 |
| 2,965,258 | 12/1960 | Wilson et al. | 72/391 |
| 3,612,728 | 10/1971 | Fulmer | 417/415 |
| 3,906,603 | 9/1975 | Romer et al. | 417/415 |
| 4,248,050 | 2/1981 | Durenec | 417/415 |
| 4,492,106 | 1/1985 | Amighini | 29/751 |
| 4,498,372 | 2/1985 | Pareja | 417/534 |
| 4,750,347 | 6/1988 | Saarinen | 72/453.16 |

FOREIGN PATENT DOCUMENTS

| | | |
|---|---|---|
| 2944011 | 2/1981 | Fed. Rep. of Germany . |
| 3719442 | 6/1988 | Fed. Rep. of Germany . |
| 640934 | 7/1928 | France . |
| 272666 | 12/1950 | Switzerland . |
| 2181693 | 4/1987 | United Kingdom . |

Primary Examiner—David Jones
Attorney, Agent, or Firm—Cushman, Darby & Cushman

[57] ABSTRACT

A motor driven hydraulic tool including a portable battery is preferably employable for a cable laying operation. To displace a movable die toward and away from a stationary die, a piston is driven by pressurized hydraulic oil fed from a hydraulic pump section. The hydraulic pump section is operatively connected to a driving mechanism including a motor via a cam link mechanism. A plunger of the cam link mechanism includes a ring-shaped fitting portion which has an eccentric shaft fitted therein to rotate freely. The eccentric shaft is made integral with the rotational shaft of a motor for the driving mechanism.

3 Claims, 4 Drawing Sheets

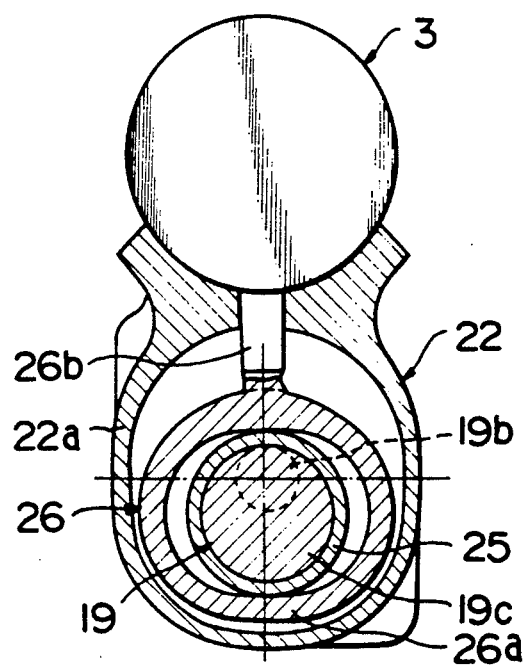
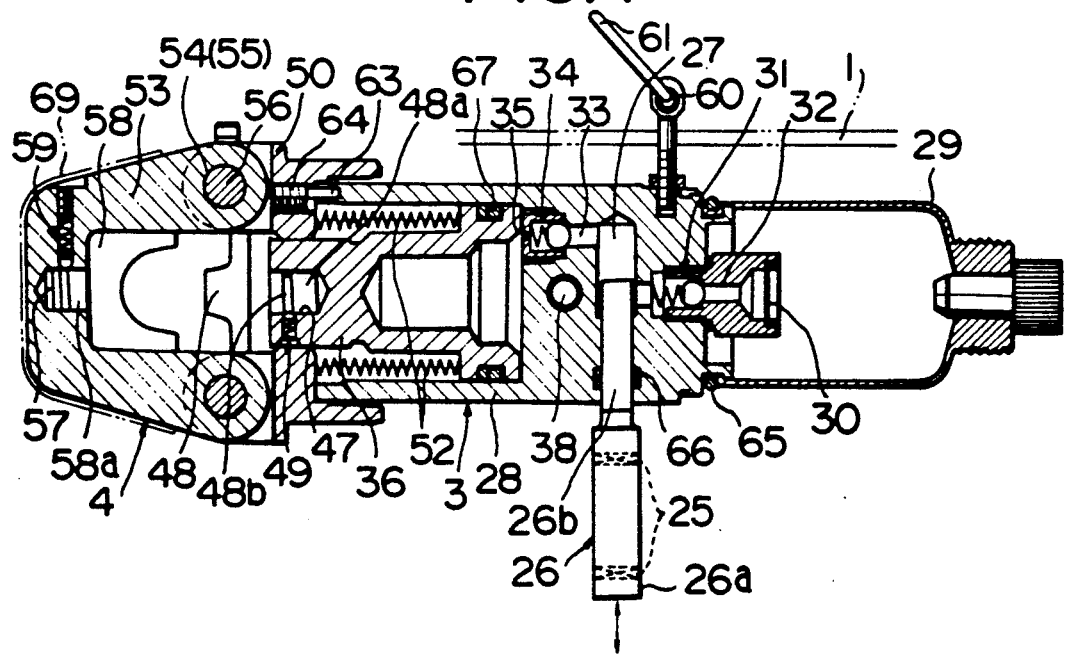

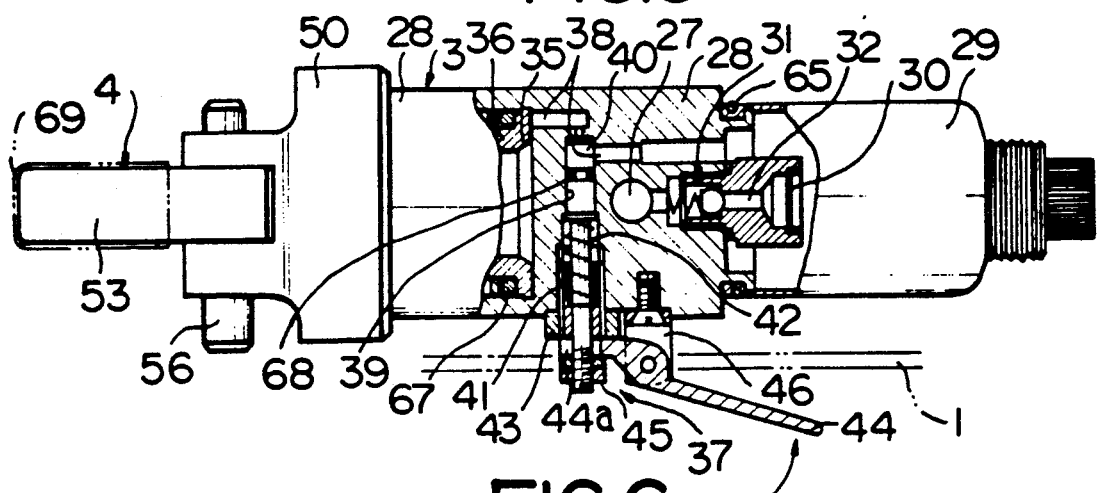
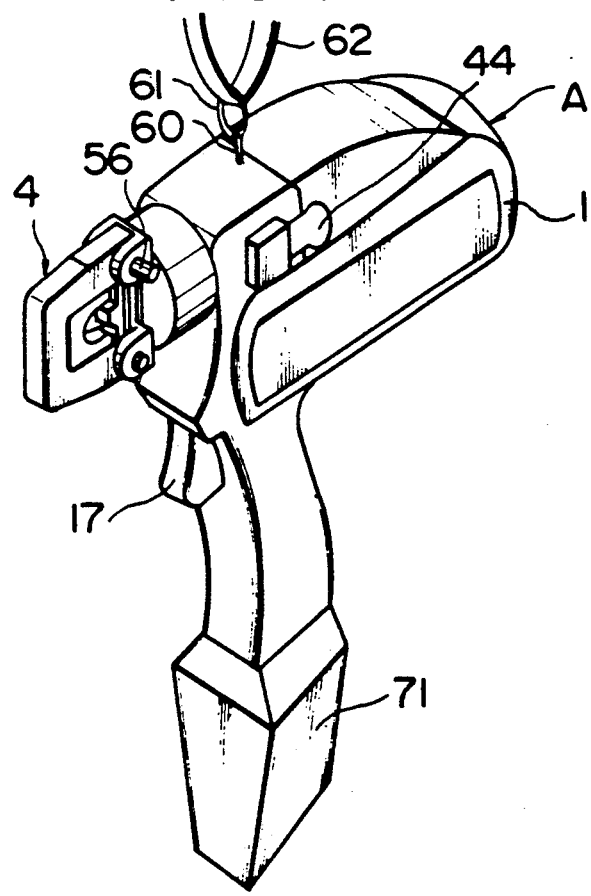

MOTOR DRIVEN HYDRAULIC TOOL

This is a continuation of application Ser. No. 07/442,694, filed on Nov. 29, 1989, which is abandoned.

BACKGROUND OF THE INVENTION

1. Technical Field

The present invention relates to a cam crank mechanism serving as a small and light power transmission mechanism for converting rotational movement into reciprocable movement. Further, the present invention relates to a portable motor driven hydraulic tool including a battery as a power supply source and a cam crank mechanism of the foregoing type preferably employable for a cable laying operation.

2. Statement of the Related Art

To perform a cable laying operation, various kinds of hydraulic tools for collapsing a terminal or sleeve for connecting conductors to each other or cutting a conductor or cable have been heretofore used by operators. The conventional hydraulic tool is typically constructed such that a hydraulic pump adapted to be driven by an engine or motor is placed on the ground and a pressure resistant hose extends between the hydraulic pump and a tool head carried by an operator which performs a cable laying operation at a high position. The hydraulic pump feeds pressurized hydraulic oil to the tool head including a stationary die and a movable die to collapse the terminal or sleeve between the both dies for connecting conductors to each other.

Also a manual hydraulic tool of the type having a hydraulic pump incorporated therein has been known. This type of hydraulic tool is used for a cable laying operation in such a manner that an operator repeatedly actuates an actuating lever by his hand to increase hydraulic pressure of hydraulic oil and the increased hydraulic pressure displaces a movable tool member toward or away from a stationary tool member to collapse a terminal or sleeve for connecting conductors to each other.

However, it has been found that the conventional hydraulic tool of the first-mentioned type has drawbacks that an operator performs a cable laying operation with much difficulties due to extension of the pressure resistance hose and moreover the heavy hydraulic pump should be displaced at every time when he changes his work location. Thus, a-cable laying operation is accomplished at a very low efficiency.

Also with respect to the hydraulic tool of the last-mentioned type, it has been pointed out as a problem that it does not use any pressure resistant hose but the tool head requires a high intensity of hydraulic pressure which is generated by an actuating lever to be actuated by an operator's hand, causing the operator to be tired as the lever is repeatedly actuated.

SUMMARY OF THE INVENTION

The present invention has been made with the foregoing background in mind.

An object of the present invention is to provide a small and light cam crank mechanism preferably employable for a motor driven hydraulic tool which assures that rotational movement of a motor is converted into reciprocable movement with a high magnitude of output for displacing a movable tool member toward or away from a stationary tool member for performing a cable laying operation without requiring a pressure resistant hose and a power supply cord.

According to one aspect of the present invention, there is provided a cam crank mechanism which comprises a rotational shaft on the prime mover side, an eccentric shaft made integral with the rotational shaft, a center of rotation of the eccentric shaft being offset from a center of rotation of the rotational shaft, and a reciprocable member in the form of a plunger including a ring at its one end, the ring having the eccentric shaft fitted therein to rotate freely.

Further, according to other aspect of the present invention, there is provided a motor driven hydraulic tool which comprises a tool head including a stationary tool member and a movable tool member, a hydraulic pump section for displacing the movable tool member toward and away from the stationary tool member, a driving mechanism including a motor for driving a reciprocable plunger at the input end of the hydraulic pump section, the driving mechanism being arranged adjacent to the hydraulic pump section, a cam crank mechanism interposed between the plunger of the hydraulic pump section and a rotational shaft at the output end of the driving mechanism, the cam crank mechanism including a ring-shaped fitting portion at one end of the plunger, the ring-shaped fitting portion having an eccentric shaft fitted therein to rotate freely, the eccentric shaft being made integral with the rotational shaft of the driving mechanism, and a portable battery serving as a power supply source for driving a motor for the driving mechanism.

BRIEF DESCRIPTION OF THE DRAWINGS

The present invention is illustrated in the following drawings in which;

FIG. 3 is an enlarged cross-sectional view of the motor driven hydraulic tool, particularly illustrating essential components for the cam crank mechanism.

FIG. 4 is an enlarged sectional view of the motor driven hydraulic tool, particularly illustrating a tool head and a hydraulic pump section.

FIG. 5 is a partially sectioned view of the motor driven hydraulic tool, particularly illustrating arrangement of the hydraulic pump section.

FIG. 6 is a perspective view illustrating a motor driven hydraulic tool in accordance with another embodiment of the present invention.

EMBODIMENTS

Now, the present invention will be described in detail hereinafter with reference to the accompanying drawings which illustrate preferred embodiments thereof.

FIGS. 1 to 5 illustrate a motor driven hydraulic tool A in accordance with a first embodiment of the present invention.

Figure 1:
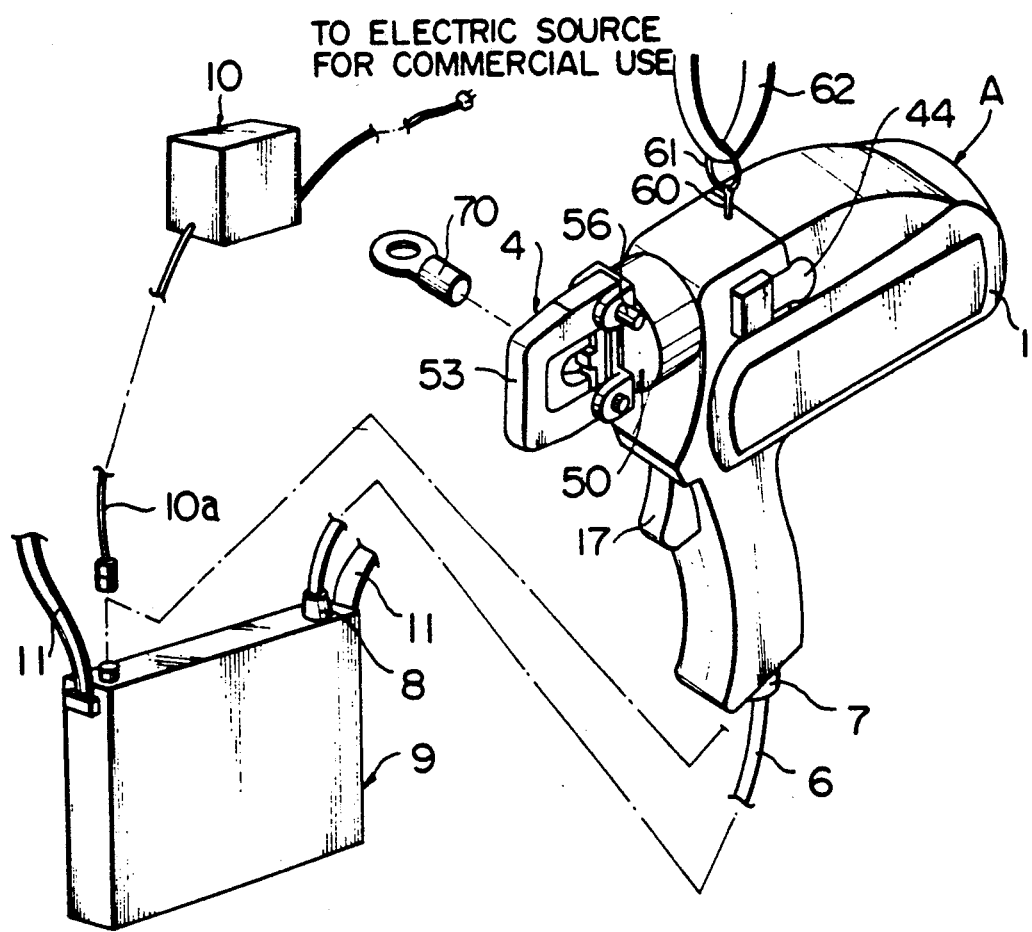
FIG. 1 is a perspective view illustrating a motor driven hydraulic tool in accordance with an embodiment of the present invention.
Figure 2:
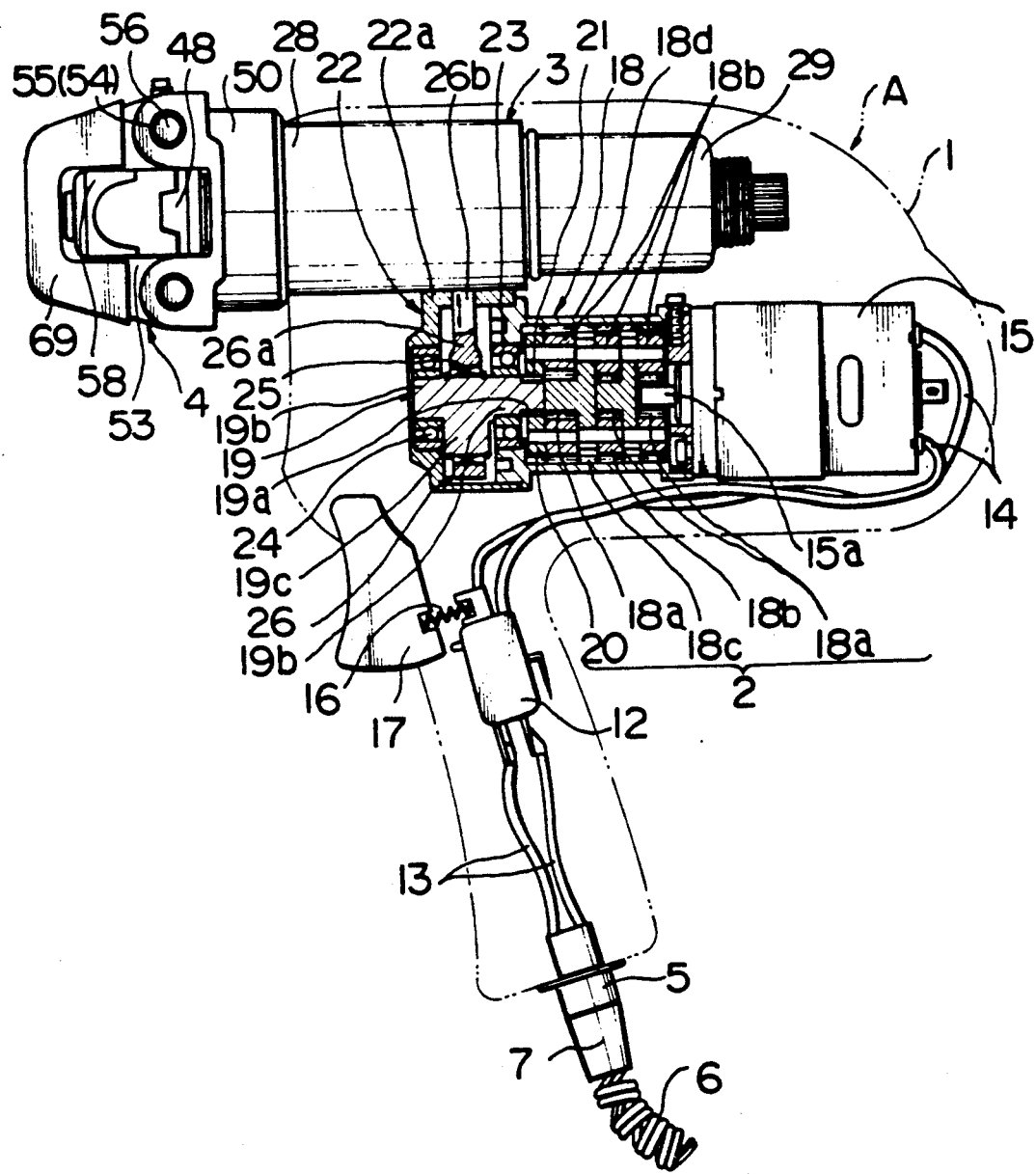
FIG. 2 is a partially sectioned side view of the motor driven hydraulic tool in FIG. 1, particularly illustrating the structure of a cam crank mechanism operatively connected to a motor.

In FIGS. 1 and 2, reference numeral 1 designates a case made of plastic material, reference numeral 2 designates a driving mechanism, reference numeral 3 designates a hydraulic pump section and reference numeral 4 designates a tool head. The case 1 includes a grip portion of which lower end has a connector 5 secured thereto. A plug 7 for a connection cord 6 is fitted into the connector 5. Opposite . end of the connection code 6 is connected to a portable battery 9 via another plug 8. The battery 9 can be recharged by a charger 10, as required. A shoulder belt 11 is attached to the battery 9 so that the battery 9 can be carried by an operator with the shoulder belt 11 extending round his shoulder.

As shown in FIG. 2, the connector 5 is connected to a motor 15 for the drive mechanism 2 via conductors 13 and 14 and a microswitch 12. The microswitch 12 is turned on or off by actuating a trigger 17 under the effect of resilient force of a return spring 16.

The drive mechanism 2 is constituted by a motor 15 and a speed reduction unit 18 operatively connected to an output shaft 15a of the motor 15. The speed reduction unit 18 comprises three sets of conventional planetary gear type speed reduction mechanisms each of which comprises a sun gear 18a, three planetary gears 18b meshing with the sun gear 18a and a ring gear 18c meshing with the respective planetary gears 18b. An eccentric shaft 19 for a cam crank mechanism 22 is coupled with an output end of the speed reduction unit 18. This coupling is accomplished by fitting a spline potion 19a at the outer end of the eccentric shaft 19 into a spline hole 21 in an annular base plate 20 by which the planetary gear 18b of the planetary gear type speed reduction mechanism at the final stage is rotatably supported. The eccentric shaft 19 comprises a rotational shaft portion 19b and an eccentric shaft portion 19c, and the rotational shaft portion 19b is rotatably supported by bearings 23 and 24. The one bearing 23 is attached to a casing 18d of the speed reduction unit 18, while the other bearing 24 is attached to a casing 22a of the cam crank mechanism 22. The casing 22a is made integral with the hydraulic pump section 3. It should of course be understood that the motor 15, the speed reduction unit 18 and the cam crank mechanism 22 are immovably accommodated in the case 1.

As shown in FIGS. 2 and 3, the eccentric shaft portion 19c of the eccentric shaft 19 is fitted into an annular L. fitting portion 26a of a cam plunger 26 via a needle bearing 25. The inner surface of the fitting portion 26a is designed in such a contour as to permit the eccentric shaft 19 to be rotated while coming in contact with the needle bearing 25 in only an eccentric direction of said bearing as the rotational shaft portion 19b is rotated. The needle bearing 25 is intended to prevent the eccentric shaft portion 19c and the fitting portion 26a from wearing due to a large magnitude of power to be transmitted from the eccentric shaft portion 19c to the fitting portion 26a of the cam plunger 26.

A plunger portion 26b of the cam plunger 26 is reciprocably inserted into a first cylinder chamber 27 of the hydraulic pump section 3. The hydraulic pump section 3 is immovably accommodated in the case 1 in the same manner as mentioned above. As shown in FIGS. 4 and 5, the hydraulic pump section 3 includes an oil tank 29 at the rear part of a cylinder 28 and the oil tank 29 is communicated with the first cylinder chamber 27 via an oil filter 30, a feed passage 32 and a check valve 31. The first cylinder chamber 27 is communicated with a second cylinder chamber 35 via a feed passage 33 and a check valve 34. A piston 36 is slidably inserted into the second cylinder chamber 35. A ratio of an inner diameter of the first cylinder chamber 27 to an inner diameter of the second cylinder chamber 35 is determined such that hydraulic pressure in the second cylinder chamber 35 reaches a required value relative to hydraulic pressure in the first cylinder chamber 27, i.e., a preset output value.

As is best seen in FIG. 5, the second cylinder chamber 35 is communicated with the oil tank 29 via two return passages 38 with a forcible return mechanism 37 serving also as a pressure limiting valve interposed therebetween.

The forcible return mechanism 37 includes a valve stem 40 which is reciprocably fitted in a fitting hole 39 to open or close the return passages 38. A pressure limiting spring 42 is interposed between an adjustable screw 41 threadably engaged with the outer end of the fitting hole 39 and the inner end of the valve stem 40. The pressure limiting spring 42 is adapted to adjust an intensity of resilient force to be given to the valve stem 40 by changing the position where the adjustable screw 41 is threadably engaged with the fitting hole 39. Arrangement of the pressure limiting spring 42 allows the valve stem 40 to be opened when hydraulic pressure required for opening the valve stem 40, i.e., hydraulic pressure required for actuating the piston 36 during an operation of collapsing a pressure collapsible terminal 70 is in excess of a preset value.

The valve stem 40 is reciprocably inserted through a hole of the adjustable screw 41. The adjustable screw 41 can be locked at a certain position by tightening a lock nut 43. The lower end of the valve stem 40 is inserted through a slit groove 44a at the fore end of a forcible return lever 44 so that the valve stem 40 can not be disconnected from the forcible return lever 44 by tightening a double nut 45. The forcible return lever 44 is turnably supported via a pin by an inverted U-shaped lever holder 46 which is firmly secured to the cylinder 28.

The piston 36 is formed with a fitting hole 47 at the fore end thereof in which the shank 48a of a movable die 48 serving as a movable tool member for a tool head 4 is detachably fitted. The shank 48a of the die 48 can immovably be held by a click stopper mechanism 49 comprising a spring and a steel ball. The shank 48a of the die 48 , of course, is formed with an annular groove 48b for receiving the steel ball of the click stopper mechanism 49.

A cylinder head 50 is threadably engaged with the head portion of the cylinder 28. A return spring 52 is interposed between the cylinder head 50 and the piston 36. Two pins 63 are secured onto the annular front face of the cylinder 28 with a properly determined distance kept therebetween, whereas a set screw 64 is fitted into a threaded hole of the cylinder head 50. Thus, free rotation of the cylinder head 50 is limited within the range of about 180 degrees by engagement of the set screw 64 with one of the pins 63.

An U-shaped yoke 53 is turnably supported on the cylinder head 50. The yoke 53 can be locked at a closed position by inserting a slide pin 56 through holes 54 and 55 in the yoke 53 and the cylinder head 50. The yoke 53 is formed with a fitting hole 57 into which the shank 58a of a stationary die 58 serving as a stationary tool member for the tool head 4 is fitted in the same manner as the movable die 48. The stationary die 58 is detachably held by a clock stopper mechanism 69.

A key ring hook 60 is threadably fitted to the cylinder 28 and a key ring 61 is engaged with the key ring hook 60. As shown in FIG. 1, a shoulder belt 62 is inserted through a hole of the key ring 61.

In FIG. 4, reference numerals 55 to 57 designate an 0-ring, respectively and reference numeral 69 designates an insulating cover. Further, in FIG. 5, reference numeral 68 designates an 0-ring.

Next, operation of the motor driven hydraulic tool A will be described below.

First, an operator walks to a working site while carrying the portable battery 9 and the motor driven hydraulic tool A with the aid of the shoulder belts 11 and 62. At this time, the portable battery 9 and the motor driven hydraulic tool A are previously connected to each other via the cord 6. Next, he opens the yoke 53 by his hand and places a collapsible terminal 70 as shown in FIG. 1 between the movable die 48 and the stationary die 58. Then, he closes the yoke 53 to the original position and actuates the trigger 17 by his finger to displace the movable die 48 toward the stationary die 58. This allows the collapsible terminal 70 to be temporarily held between the movable die 48 and the stationary die 58 to such an extent that it is not fully collapsed and does not fall out. In response to actuation of the trigger 17, the microswitch 12 is turned on and thereby the motor 15 receives electricity from the portable battery 9 via the cord 6.

As the motor 15 is driven, the eccentric shaft 19 is rotated via the speed reduction unit 18. Since the eccentric shaft portion 19c of the eccentric shaft 19 is fitted into the fitting portion 26a of the cam plunger 26, the cam plunger 26 is reciprocably displaced as the eccentric shaft 19 is rotated. This causes hydraulic oil in the oil tank 29 to be introduced into the first cylinder chamber 27 via the oil filter 30 and the check valve 31. Then, the hydraulic oil in the first cylinder chamber 27 is pumped to the second cylinder chamber 35 via the check valve 34. As the second cylinder chamber 35 is filled with pressurized hydraulic oil, the piston 36 moves forwardly to displace the movable die 48 toward the stationary die 58.

While the collapsible terminal 70 is immovably held between the movable die 48 and the stationary die 58, conductors to be connected to each other via the collapsible terminal 70 are inserted into it. Then, he actuates the trigger 17 to drive the motor 51. As the motor 51 is driven, the cam plunger 26 is reciprocably displaced via the speed reduction mechanism 18 to activate the hydraulic pump section 3, whereby the movable die 48 moves forwardly until the collapsible terminal 70 is fully collapsed between the movable die 48 and the stationary die 58.

On completion of the collapsing operation, the movable die 48 does not move further any longer irrespective of additional feeding of hydraulic oil in the second cylinder chamber 35. This causes hydraulic pressure in the second cylinder chamber 35 to be increased excessively, whereby the valve stem 40 of the forcible return mechanism 37 is opened against resilient force of the pressure limiting spring 42. Thus, a quantity of hydraulic oil corresponding to a fraction in excess of the value set by the pressure limiting spring 42 flows back to the oil tank 29. Therefore, after the collapsible terminal 70 has been completely collapsed in that way, the movable die 48 does not perform a collapsing operation any more irrespective of how often he actuates the trigger 17! i.e., the movable die 48 performs a so-called idling operation. Consequently, the conductors are connected to each other via the collapsed terminal 70.

Thereafter, the return lever 44 is actuated by an operator's finger to forcibly displace the valve stem 40 against resilient force of the pressure limiting spring 42, resulting in the return passages 38 being opened. This permits the piston 36 to be displaced rearwardly under the effect of resilient force of the return spring 52, whereby hydraulic oil in the second cylinder chamber 35 flows back into the oil tank 29 via the return passages 38.

Next, he opens the yoke 53 and disconnects the motor driven hydraulic tool A from the conductors which have been connected to each other via the collapsed terminal 70. Thus, a connecting operation has been completed with the fully connected conductors.

As required, the movable die 48 and the stationary die 58 are adequately replaced with other ones in dependency on the diameter of conductors to be connected to each other, the kind of a collapsible terminal 70 and the kind of other connection portions. Additionally, associated components for the tool head 4 such as a cylinder head, a yoke and others may be replaced with other ones, as required.

If the portable battery 9 becomes exhausted because of usage for a long period of time, it can be reused by recharging it from a commercial electrical power supply source via the charger 10. In the case where a cable laying operation is performed at a location where a commercial power supply source is comparatively easily available, the motor 15 may be driven directly via the commercial power supply source by connecting the output cable 10a of the charger 10 to the connector 5 of the motor driven hydraulic tool A.

FIG. 6 illustrates by way of a perspective view a motor driven hydraulic tool A in accordance with a second embodiment of the present invention.

The second embodiment is different from the first embodiment in such a manner that a small-sized rechargeable battery 71 is detachably secured to the bottom end of the grip portion of the motor driven hydraulic tool A so that the motor 15 is driven by the battery 71 via the microswitch 12. Other structure of the motor driven hydraulic tool A rather than the above-described respect is the same as that of the first embodiment. Thus, repeated description will not be required.

As will be readily apparent from the above description, the cam crank mechanism of the present invention is such that rotational movement of a motor or the like prime mover is converted into reciprocable movement of the piston or plunger of a hydraulic pump with a large magnitude of output. Thus, since it can be designed and constructed with light weight in smaller dimensions, it is advantageously employable for a portable type motor driven hydraulic tool. Consequently, the motor driven hydraulic tool itself can be designed and constructed with light weight in smaller dimensions.

Further, with the motor driven hydraulic tool of the present invention, a cable laying operation can be performed without any necessity for a hydraulic connecting member such as a pressure resistant hose extending between a tool head to be carried by an operator and a hydraulic pump placed on the ground to be driven by an engine or motor as is the case with a conventional hydraulic tool. Accordingly, an operator can walk freely without restriction due to arrangement of such a hydraulic connecting member as mentioned above and thereby a cable laying operation can be accomplish at an excellently high efficiency. In addition, the motor driven hydraulic tool of the present invention is free from such a problem inherent to the conventional hydraulic tool of the type having a hydraulic motor incorporated therein that an operator is tired within a short period of time because of necessity for a large magnitude of actuating force required for actuating an actuating lever for the conventional hydraulic tool. Thus, the motor driven hydraulic tool of the present invention can very conveniently be used, without any troublesome actuation, owing to the fact that it is designed in a handy structure and generates high output.

What is claimed is:

1. A portable hydraulic tool for use in cable laying comprising:
   a tool head including a stationary tool member and a movable tool member,
   a hydraulic transmitting mechanism for displacing said movable tool member toward and away from said stationary tool member,
   a unit generating a hydraulic pressure by reciprocating a plunger by means of a cam crank mechanism, a speed reduction unit of a motor for driving said cam crank mechanism, and an electric power supply source for the motor, characterized in that said cam crank mechanism comprises a rotational shaft, an eccentric shaft integral with said rotational shaft, a cam plunger assembly having a reciprocal plunger for generating a hydraulic pressure, said reciprocal plunger having first and second longitudinal ends and a ring at one of said longitudinal ends, the eccentric shaft being fitted in said ring so as to be freely rotatable with respect thereto to reciprocate the plunger along a longitudinal axis thereof, said ring bearing an inner surface formed in a non-circular contour so as to contact the eccentric shaft solely in the reciprocating direction and thereby displace the plunger solely along said longitudinal axis, said speed reduction unit comprising three sets of planetary gears, and
   a portable battery serving as said electric power supply source for driving the motor bearing.

2. A portable hydraulic tool as claimed in claim 1, wherein said portable battery is a rechargeable battery.

3. A portable hydraulic tool for use in cable laying comprising:
   a tool head including a stationary tool member and a movable tool member,
   a hydraulic transmitting mechanism for displacing said movable tool member toward and away from said stationary tool member,
   a unit generating a hydraulic pressure by reciprocating a plunger by means of a cam crank mechanism, a speed reduction unit of a motor for driving said cam crank mechanism, and an electric power supply source for the motor, characterized in that said cam crank mechanism comprises a rotational shaft, and eccentric shaft integral with said rotational shaft, a cam plunger assembly having a reciprocal plunger for generating a hydraulic pressure, said reciprocal plunger having first and second longitudinal ends and a ring at one of said longitudinal ends, the eccentric shaft being fitted in said ring so as to be freely rotatable with respect thereto, said ring bearing an inner surface formed in a contour so as to permit said eccentric shaft fitted therein to reciprocate the plunger, said speed reduction unit comprising three sets of planetary gears,
   a portable battery serving as said electric power supply source for driving the motor, and
   an aperture defined through said tool head and extending in a direction substantially perpendicular to a line connecting said stationary tool member and said movable tool member whereby an object inserted through said aperture and between said stationary tool member and said movable tool member can be crimped therebetween.

* * * * *